Jan. 18, 1966 D. C. BUCKLAND 3,229,742
SAFETY CLIP
Filed Aug. 15, 1962

INVENTOR.
DWIGHT C. BUCKLAND
BY
Agent

United States Patent Office 3,229,742
Patented Jan. 18, 1966

3,229,742
SAFETY CLIP
Dwight C. Buckland, Granada Hills, Calif., assignor to Lockheed Aircraft Corporation, Burbank, Calif.
Filed Aug. 15, 1962, Ser. No. 217,140
3 Claims. (Cl. 151—33)

This invention relates to a safety locking device and more particularly to a safety clip adaptable for application to nut means or other structure to prevent relative rotation thereof.

For many years it has been the practice throughout industry to utilize safety wiring techniques wherein wire is inserted through holes in the bodies or heads of the unit to be "safetied." The wire is then twisted by hand between the units and at the terminal end of the wire to prevent rotation of the devices so "safetied." Such techniques are time consuming, costly, and virtually impossible of accomplishment in many inaccessible regions. It is usually a requirement in the final installation of electrical connectors, for example, that safety wire be installed to prevent the retainer screw portions thereof from loosening during operation. Such standard safety wiring techniques have also been detrimental in that ends cut from the wire many times fall into blind areas of adjacent structures. Such wire segments are detrimental from the mechanical hazard and safety aspect in many instances. Additionally it is often found that safety wires are installed backward, causing nuts, etc. to which they are applied to loosen during operation.

It is an object of this invention to provide safety means whereby unskilled persons may install same substantially without possibility of error.

Another object of this invention is to provide a safety clip capable of rapid installation in accessible or inaccessible areas.

Still another object is to provide a reuseable safety clip which is capable of installation and removal with minimum effort.

These and other objects and advantages of the invention will be more readily understood from the following description taken in conjunction with the accompanying drawing, in which.

The invention in its general form comprises a wire formed to include a flexible loop of approximately 360° intermediate of free ends thereof, the wire including bent portions adjacent its ends so directed that tip portions thereof may be inserted through perforations in devices to be locked, the wire including sufficient spring force to maintain the clip in the installed position and the loop being compressible to facilitate installation and removal.

Figure 1:
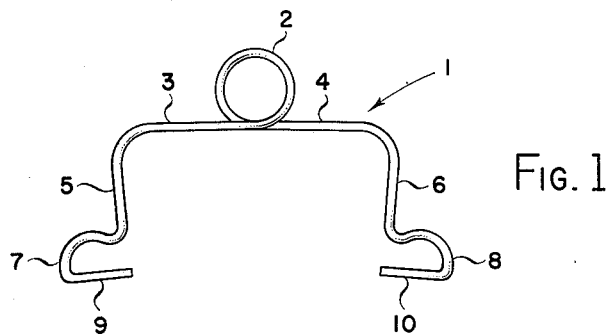
FIGURE 1 is a plan view of a typical embodiment of this invention.

In detail, FIGURE 1 illustrates a safety clip 1 which may be fabricated from any wire material capable of retaining its formed characteristics under reasonable operating conditions. It should preferably be of sufficient stiffness to resist structural deformation from extraneous forces and include memory characteristics sufficient to return it to its initially formed shape when removed from its installed position.

The safety clip 1 includes a loop 2 of substantially 360° preferably positioned approximately intermediate of the structure. Hence, the face ends of loop 2 are crossed to form essentially a closed loop capable of expansion or compression to different diameters upon application of pressure thereto by appropriate tool means, e.g. common pliers. Extension portions 3 and 4 extend mutually opposite one another from the loop 2 and are of any length compatible with desired design characteristics. A pair of legs 5 and 6 are attached to the extensions 3 and 4 and extend in any desired direction therefrom. In FIGURE 1 they are illustrated as being in substantially the same plane with loop 2 and extending opposite thereto. Bent into a desirably shaped configuration at the extremities of legs 5 and 6 are arcuately shaped terminal portions 7 and 8. The terminal portions 7 and 8 may also depend from legs 5 and 6 at any desirable angle and in whatever shape may be required to meet the design requirements of the device to which the safety clip is to be adapted. In the present instance, the terminal portions 7 and 8 are illustrated as being rounded in contour to match the shape of a particular nut head to which the safety clip is adapted (FIGURE 2).

To the extremities of terminal portions 7 and 8 are attached a pair of tips or detents 9 and 10, respectively. These tips, in order to provide the safety clip with maximum utility, are inwardly directed in essentially the manner illustrated. Thereby, the safety clip may be easily installed upon and removed from retainable structure by the simple expedient of using standard pliers or especially designed tool means to compress the loop 2, thereby forcing apart the legs 5 and 6 and portions attached outwardly thereto.

Figure 2:
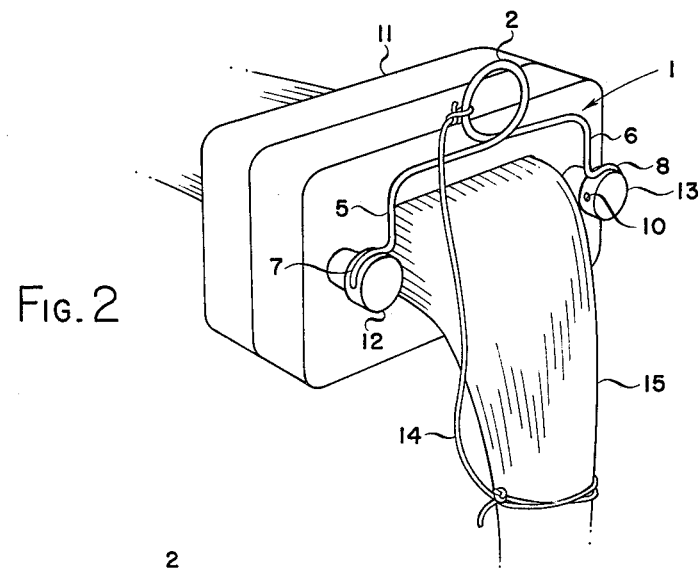
FIGURE 2 illustrates the safety clip of this invention typically installed in an electrical connector.

FIGURE 2 illustrates the safety clip 1 in a typically installed position on an electrical connector. It is to be understood, however, that the same is by way of illustration only, the safety clip being equally adaptable to a variety of other applications. The electrical connector, generally indicated by numeral 11, includes a pair of screws or nuts 12 and 13 which are adapted for holding the various portions of the connector 11 together. When such screws are tightened to their desired torque the safety clip 1 is installed essentially as illustrated, tips 9 and 10 being inserted through holes provided in the cylindrical heads of screws 12 and 13 for that purpose. In this instance terminal portions 7 and 8 are shaped as illustrated in FIGURE 1 such that their contours match the external head configuration of nuts 12 and 13. This provides the capability of locking the safety clip in the illustrated relative orientation without danger of its being rotated into a position which could interfere with adjacent structure.

A lanyard or attachment means 14 is sometimes secured through the loop 2 and to related structure, such as the wire bundle 15, here illustrated, to prevent the safety clip from being lost during periods of removal from its installed poistion and to maintain its relative proximity to the structure. It is thereby readily available for re-use.

It is to be noted that at no time throughout the installation or removal procedures relative to the present safety clip is it necessary that two hands be utilized for installation purposes. Hence, installation in remote and otherwise inaccessible areas may be accomplished with a minimum of effort. Additionally, no materials hazardous to adjacent mechanisms are at any time removed from the present clip, such as is the prevalent practice in standard safety wiring techniques, the clip described herein being prefabricated to its desired shape prior to installation. The clip may also be used and re-used an indeterminate number of times, thereby lending extreme economy where the periodic removal of the safety device is required.

Figure 3:
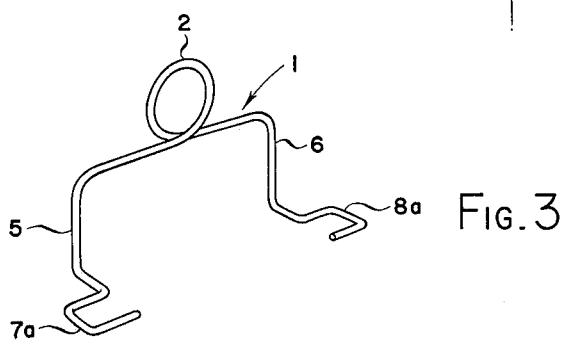
FIGURE 3 illustrates an alternate embodiment of the invention.

FIGURE 3 illustrates an alternate embodiment of the safety clip 1 wherein the terminal portions 7a and 8a extend from the legs 5 and 6 at approximately 90° from the plane of those legs and wherein the terminal portions are squared to provide an illustration of typical deviations from the preferred embodiment of FIGURE 1.

While there have been shown, described and pointed out the fundamental novel features of the invention as applied to preferred embodiments, it will be understood that various omissions, substitutions and changes in form and details of the device illustrated and its operation may be made by those skilled in the art without departing from the spirit of the invention; therefore, the invention is to be limited only by the scope of the following claims.

I claim:
1. A safety clip for engaging a pair of spaced threaded fasteners each having an opening through a head with the openings being aligned with each other comprising:
   a wire being formed with a 360° loop and a pair of extension portions extending in opposite directions from the loop,
   a leg extending from each of the wire extension portions and being disposed at 90° to the extension portion with each leg extending in the same general direction,
   a tip extending from each leg, each such tip directed toward the other said tip and being disposed at 90° relative to the respective leg, said tips terminating substantially in the planes of their respective legs,
   a terminal portion being disposed between each said tip and leg,
      the terminal portion being formed to mate with the external periphery of the threaded fastener head and to extend around the fastener head more than 90° and less than 180° such that the terminal portion provides a spring force which tends to prevent removal of the safety clip.

2. In combination with a pair of spaced threaded fasteners each having an opening therethrough in substantial alignment with the other;
   a wire being formed with a 360° loop and a pair of extension portions extending in opposite directions from the loop,
   a leg extending from each of the wire extension portions and being disposed at substantially 90° to the extension portion with each leg extending in the same general direction,
   a tip extending from each leg, each such tip directed toward the other said tip and being disposed at substantially 90° relative to the respective leg, said tips terminating substantially in the planes of their respective legs,
   a terminal portion being disposed between each said tip and leg,
      the terminal portion being formed to mate with the external periphery of the threaded fastener head and to extend around the fastener more than 90° and less than 180° such that the terminal portion provides a spring force which tends to prevent removal of the safety clip.

3. A safety clip for engaging a pair of spaced threaded fasteners each having an opening therethrough in substantial alignment with the other;
   a wire being formed with a 360° loop and a pair of extension portions extending in opposite directions from the loop,
   a leg extending from each of the wire extension portions and being disposed in a common plane at substantially 90° to the extension portion,
   a tip extending from each leg, each such tip directed toward the other said tip and being disposed at substantially 90° relative to the respective leg, said tips terminating substantially in the planes of their respective legs,
   a terminal portion being disposed between each said tip and leg,
      said terminal portions and said tips lying in a common plane oriented at approximately 90° from the plane of said legs, each said terminal portion including a series of sections extending at substantially right angles to one another and connecting one of said legs to its tip.

References Cited by the Examiner

UNITED STATES PATENTS

| | | | |
|---|---|---|---|
| 463,650 | 11/1891 | Stevens | 151—44 |
| 1,126,847 | 2/1915 | Pardini | 151—27 |
| 1,271,643 | 7/1918 | Winton | 151—11 |

FOREIGN PATENTS

| | | |
|---|---|---|
| 15,710 | 11/1884 | Great Britain. |

EDWARD C. ALLEN, *Primary Examiner.*